(12) United States Patent
Sakamoto et al.

(10) Patent No.: US 8,827,690 B2
(45) Date of Patent: Sep. 9, 2014

(54) HOLLOW BODY MOLDING DEVICE

(75) Inventors: Tomoyoshi Sakamoto, Ota (JP); Minoru Ojiro, Ota (JP); Takashi Hirose, Ota (JP); Yasuhiko Hata, Ota (JP); Hiroki Katagiri, Ota (JP)

(73) Assignee: RP Topla Limited, Osaka (JP)

(*) Notice: Subject to any disclaimer, the term of this patent is extended or adjusted under 35 U.S.C. 154(b) by 0 days.

(21) Appl. No.: 13/988,079

(22) PCT Filed: Nov. 30, 2011

(86) PCT No.: PCT/JP2011/077642
§ 371 (c)(1),
(2), (4) Date: May 17, 2013

(87) PCT Pub. No.: WO2012/086378
PCT Pub. Date: Jun. 28, 2012

(65) Prior Publication Data
US 2013/0236591 A1  Sep. 12, 2013

(30) Foreign Application Priority Data

Dec. 22, 2010 (JP) .................................. 2010-285716

(51) Int. Cl.
*B29C 45/04* (2006.01)
(52) U.S. Cl.
USPC ............ 425/577; 264/512; 425/544; 425/557
(58) Field of Classification Search
CPC .... B29C 33/34; B29C 33/36; B29C 45/1639; B29C 45/261; B29C 45/2669; B29C 2045/1719
USPC ....................... 264/319, 328.1, 503, 512, 573; 425/544, 557, 577
See application file for complete search history.

(56) References Cited

U.S. PATENT DOCUMENTS 5,948,343 A * 9/1999 Hiroki et al. .................. 264/503
8,550,154 B2 * 10/2013 Ojiro et al. .................... 165/170
(Continued)

FOREIGN PATENT DOCUMENTS

JP    7-108562 A    4/1995
JP    11-114997 A   4/1999
(Continued)

OTHER PUBLICATIONS

PCT/ISA/210 International Search Report mailed on Feb. 21, 2012, issued in PCT/JP2011/077642.

*Primary Examiner* — Yogendra Gupta
*Assistant Examiner* — Emmanuel S Luk
(74) *Attorney, Agent, or Firm* — Birch, Stewart, Kolasch & Birch, LLP

(57) ABSTRACT

A hollow body molding device having molten resin injected into a main cavity, fluid is pressure-injected through a pressure port after the injection of molten resin, a floating core moves to the outlet side, the molten resin is extruded from the outlet simultaneously with the movement of the floating core, and a hollow molded body is molded, the hollow body molding device having a floating core storage portion connected to the main cavity and stores the floating core moved by the pressurized fluid, an auxiliary cavity stores molten resin discharged from the main cavity and the floating core storage portion, communication passages and which communicate the floating core storage portion and the auxiliary cavity with each other; and an opening and closing means that opens and closes the communication passages by sliding movement. In the hollow body molding device, each inlet cross-sectional area B of the communication passages is specified.

5 Claims, 13 Drawing Sheets

(56) References Cited

U.S. PATENT DOCUMENTS

| | | | |
|---|---|---|---|
| 8,679,397 B2* | 3/2014 | Sakamoto et al. | 264/544 |
| 2011/0210482 A1* | 9/2011 | Sakamoto et al. | 264/531 |
| 2011/0254203 A1* | 10/2011 | Eckardt | 264/328.14 |
| 2011/0285057 A1* | 11/2011 | Ojiro et al. | 264/328.1 |
| 2012/0068388 A1* | 3/2012 | Sakamoto et al. | 264/573 |

FOREIGN PATENT DOCUMENTS

| | | |
|---|---|---|
| JP | 2010-195032 A | 9/2010 |
| WO | WO 2010/11165800 A1 | 10/2010 |

\* cited by examiner

HOLLOW BODY MOLDING DEVICE

TECHNICAL FIELD

The present invention relates to a hollow body molding device which produces a hollow molded body and particularly a pipe having a bent portion by an injection molding method.

BACKGROUND ART

In general, as a method for forming a hollow in a synthetic resin molded body, a blow molding method is most well known and widely used in production of bottles, containers, pipes, and the like. However, there are many design restrictions in the blow molding method, the selection of adaptable materials is limited, and further there is such a problem that the dimensional accuracy is not very good.

Thus, in recent years, various hollow molding methods using injection molding are proposed and include a lost core method, a two-shell molding/welding method, and a die slide injection molding method (see, Patent Literature 1). However, it is difficult to produce a long three-dimensionally bent pipe having a bent portion, using those molding methods.

As a molding method for solving the above problems, a method using a floating core is known (Patent Literatures 1 to 3).

CITATION LIST

Patent Literature

Patent Literature 1: Plastic Age, April 2010, pp. 103 to 108
Patent Literature 2: Japanese Patent Application Laid-Open No. 4-208425
Patent Literature 3: Japanese Patent Application Laid-Open No. 8-229992
Patent Literature 4: Japanese Patent Application Laid-Open No. 8-229993

DISCLOSURE OF THE INVENTION

Problems to be Solved by the Invention

In a method using a floating core, if conditions including molding conditions, a resin temperature, an injection pressure, and a timing at which the floating core is flown are not optimized, the floating core is stopped in the middle of a molten resin, and a hollow may be formed ahead of the stopped position with the use of only a pressurized fluid. In this case, uniformity of the inner diameter cannot be maintained, and such an inconvenience that the inner surface is not smooth occurs. However, since the hollows are formed at both ends of a hollow body, it is apparently difficult to distinguish such defective products from non-defective products, and it is difficult to find the defective products at the site. Thus, means that allows easy confirmation of whether or not a floating core has passed through a molded body as a finished product immediately after molding and facilitates quality control at the site is required.

In view of the above problems, the present invention provides a hollow body molding device which provides a hollow molded body having an excellent appearance and an excellent dimensional stability and, at the same time, having a uniform inner diameter and a smooth inner surface, allows easy confirmation of passage of a floating core through a molded body immediately after molding, and facilitates quality control at the site.

Means for Solving the Problems

Namely, in a hollow body molding device of the present invention, a molten resin is injected into a main cavity having on its one end a pressure port provided with a floating core and on its other end an outlet, a pressurized fluid is pressure-injected through the pressure port after the injection of the molten resin, the floating core the outlet side is moved, the molten resin is extruded from the outlet simultaneously with the movement of the floating core, and a hollow molded body is molded. The hollow body molding device is provided with a floating core storage portion which is connected to the main cavity and stores the floating core moved by the pressurized fluid, an auxiliary cavity which stores a molten resin discharged from the main cavity and the floating core storage portion, a communication passage which communicates the floating core storage portion and the auxiliary cavity with each other, and an opening and closing means that opens and closes the communication passage by sliding movement. In the hollow body molding device, an inlet cross-sectional area B of the communication passage is $B < \pi A^2/4$ (A is the maximum diameter of the floating core).

Effect of the Invention

According to the present invention, there can be obtained a hollow molded body which has an excellent appearance and an excellent dimensional stability and, at the same time, has a uniform inner diameter and a smooth inner surface. It is possible to easily confirm that a floating core has passed through the hollow molded body, and such an excellent effect that quality control at the site is easy is exercised.

MODE FOR CARRYING OUT THE INVENTION

Hereinafter, embodiments of the present invention will be described with reference to the drawings. The present invention is not limited to the embodiments. Note that well-known techniques in the relevant technical field are applied to portions not illustrated or described in this specification.

First Embodiment

Figure 1:
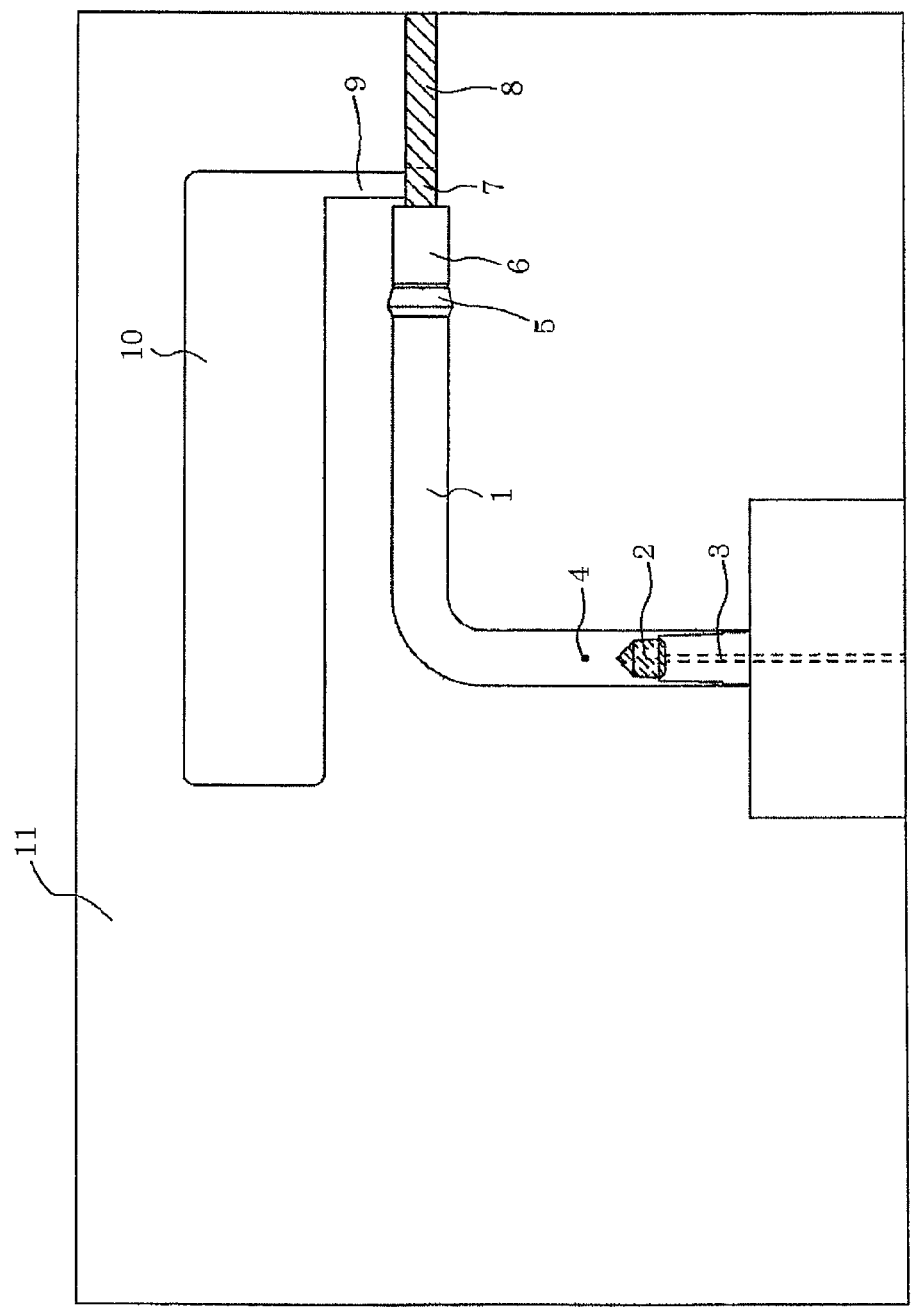
FIG. 1 is a schematic view showing a hollow body molding device of a first embodiment.

First, a hollow body molding device of this embodiment will be described with reference to FIG. 1. FIG. 1 is a schematic view of a hollow body molding device of this embodiment and shows a state in which a floating core is fitted in a pressure port. In FIG. 1, for convenience of description, an inside of a device 11 is seen even when a stationary die and a movable die are assembled together.

The hollow body molding device 11 of this embodiment is an injection molding die and is constituted of the stationary die having an injection gate 4 for a molten resin and the movable die moving when being opened and assembled. As shown in FIG. 1, the hollow body molding device 11 of this embodiment is constituted of a main cavity 1 for molding a hollow molded body such as a pipe, the injection gate 4 through which a resin is injected into the main cavity 1, a floating core 2, a pressure port 3, a molded body end 5, a floating core storage portion 6, a discharge passage 7, an opening and closing means 8 opening and closing the discharge passage 7 by sliding movement, an auxiliary cavity 10 as a waste cavity storing a discharged molten resin, and a runner 9 communicating the auxiliary cavity 10 and the discharge passage 7 with each other. In this embodiment, the discharge passage 7 and the runner 9 are communication passages for communicating the floating core storage portion 6 and the auxiliary cavity 10.

The main cavity 1 forms a molding space along an outer shape of a hollow molded body (pipe) having a bent portion (elbow portion), and the pressure port 3 fitted with the floating core 2 is disposed at one end (base end) of the main cavity 1. The injection gate 4 through which a molten resin is injected into the main cavity 1 is open at an intermediate portion of a straight portion on the base end side of the main cavity 1.

Meanwhile, the molded body end 5 defining a tail end of a hollow molded body formed in the main cavity 1 is formed at the other end of the main cavity 1 (end on the outlet side). The outer periphery of the molded body end 5 of this embodiment has a protrusion larger than the outer diameter of the main cavity 1. Although only a mere mark used when the floating core storage portion 6 and the hollow molded body 12 (see, FIG. 7) as a final product are cut and separated may be just provided at the molded body end 5, it is preferable to provide a concavo-convex portion used for coupling to a member formed of another material, such as a rubber pipe and a metal component.

The floating core storage portion 6 storing the floating core 2 having passed through the main cavity 1 is connected to the downstream side in a molten resin flow direction of the main cavity 1. The floating core storage portion 6 is formed to have an inner diameter the same as or more than the inner diameter of the main cavity 1. It is preferable that the length L (see, FIG. 6) of the floating core storage portion 6 is set so that the floating core 2 can be satisfactorily stored, in consideration of workability when the floating core storage portion 6 and the hollow molded body 12 are cut and separated, and it is preferable that L>1.1 K. K is the maximum length of the floating core 2 (see, FIG. 5). If the floating core storage portion 6 is too long, a useless molded portion is molded, and therefore, it is preferable that L<20 K. In this embodiment, although the floating core storage portion 6 is constituted of a straight pipe, the floating core storage portion 6 may be constituted of a bent pipe to adapt the sliding direction of the opening and closing means 8 and a die structure.

The discharge passage 7 into which a molten resin flows is connected to the downstream side of the floating core storage portion 6. The inlet cross-sectional area (inlet cross-sectional area of the communication passage) B (see, FIG. 6) of the discharge passage 7 is $B<\pi A^2/4$. A is the maximum diameter of the floating core 2 (see, FIG. 5). It is necessary that $B<\pi A^2/4$ because the inlet of the discharge passage 7 which is an outlet of the floating core storage portion 6 is closed by the floating core 2, and then the discharge passage 7 is sealed to hold the inner pressure of the hollow molded body 12 immediately after molding, and, thus, to prevent shrinkage or the like, whereby the appearance and dimensional stability are required to be enhanced. The length of the discharge passage 7 is arbitrary and is determined by a stroke of the opening and closing means 8. A part of the discharge passage 7 may have a length that allows branching of the runner 9 communicating the discharge passage 7 with the auxiliary cavity 10. If the discharge passage 7 is too long, a waste resin molded portion is formed, and thus it is not preferable.

The runner 9 is connected to an intermediate portion of the discharge passage 7 while being branched from the discharge passage 7. The auxiliary cavity 10 is communicated with the discharge passage 7 through the runner 9. The auxiliary cavity 10 is a space for storing an excess resin discharged by the floating core 2 pushed into a resin.

The opening and closing means 8 slides in the discharge passage 7 and thereby opens and closes the communication passage (the discharge passage 7 and the runner 9 in this embodiment). The opening and closing means 8 is operated to slide in the discharge passage 7 and close the inlet of the runner 9 when a molten resin is filled in the main cavity 1 and is operated to slide in the discharge passage 7 and open the inlet of the runner 9 when an excess resin discharged by the floating core 2 is stored in the auxiliary cavity 10. Although the opening and closing means 13 is not limited especially, there can be applied means (shutoff pin) that opens and closes the runner 9 by means of, for example, hydraulic pressure, using a slidably opening/closing pin or the like. Although a cross-sectional shape of the shutoff pin is arbitrary and, for example, a triangular shape, a square shape, a rectangular shape, or a circular shape, the cross-sectional shape is preferably a circular shape for manufacturing a mold.

Next, a molding method using the hollow body molding device 11 of this embodiment will be described with reference to FIGS. 1 to 8. In FIGS. 1 to 4 and 6, for convenience of description, the inside of the device 11 is seen even when the stationary die and the movable die are assembled together.

As shown in FIG. 1, the floating core 2 is fitted in the pressure port 3 on the base end side of the main cavity 1, and the movable die is moved to place the hollow body molding device 11 in a die assembled state. The opening and closing means 8 is in a state of closing the communication passage.

As the material of the floating core 2, although any materials such as resin, metal, and ceramic can be used, it is preferable to use a resin which is not required to be separated from the auxiliary cavity 10 and the like and facilitates discarding of the auxiliary cavity 10 and the like, and it is more preferable to use a resin which can be reproduced with the auxiliary cavity 10 and the like and is the same as a hollow molded body. Although the floating core 2 may be previously provided, the floating core 2 may be molded simultaneously with molding of a hollow molded body as a final product by the hollow molding method disclosed in the Patent Literature 4.

The floating core 2 preferably has a spherical shape, a hemispherical shape, a conical shape, a bullet shape, or the like, and especially in this embodiment, the floating core having a bullet shape whose front end has a conical shape is used, for example. The bullet shape is exemplified in FIG. 5 and is a shape constituted of a cylindrical portion 2a and a top portion 2b connecting to one surface of the cylindrical portion 2a and having a shape in which a cross-sectional area vertical to the central axis of the cylindrical portion 2a gradually decreases from one surface side of the cylindrical portion 2a.

Figure 2:
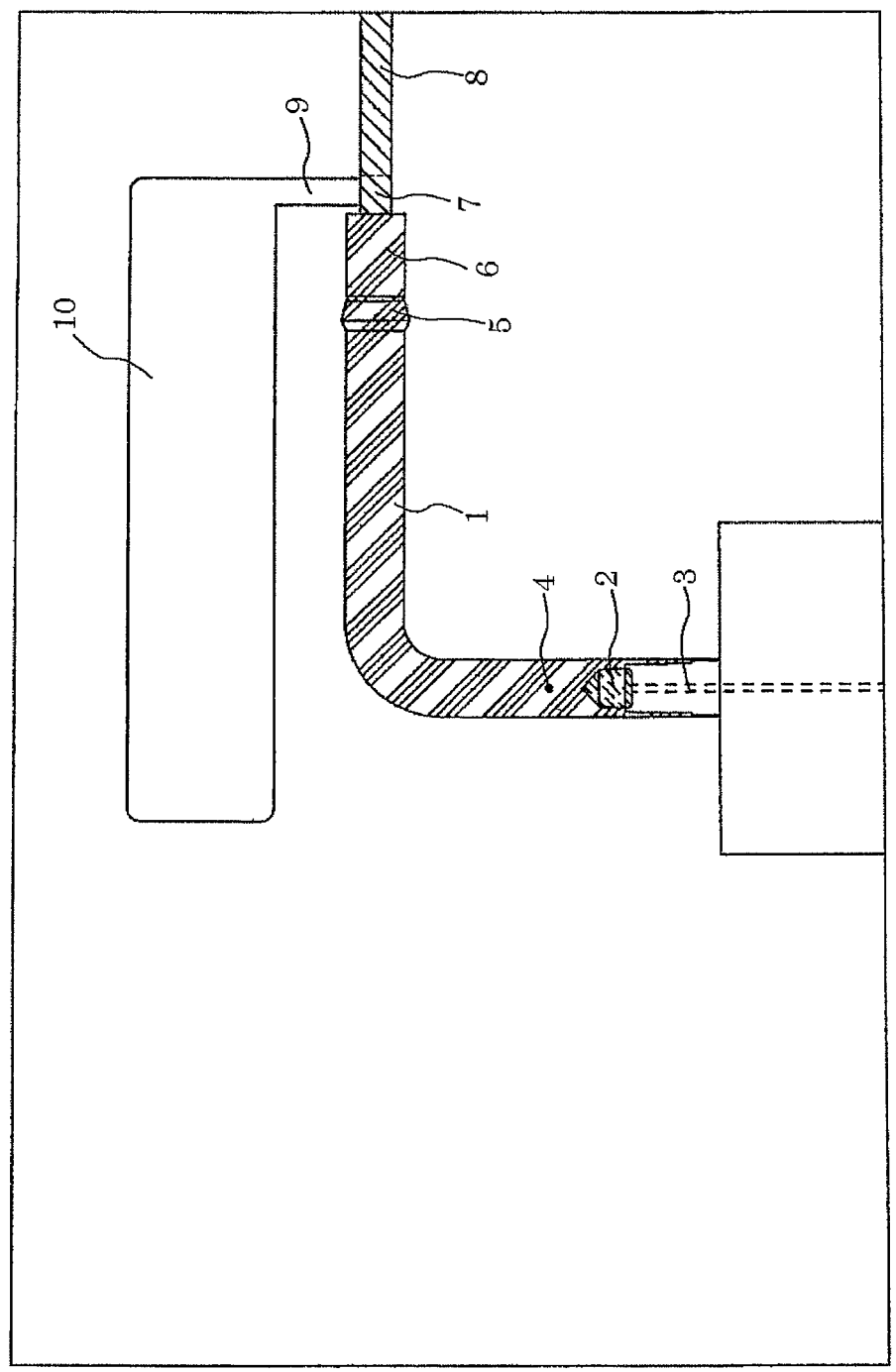
FIG. 2 is a schematic view showing a state in which a molten resin is filled in a main cavity and a floating core storage portion in the hollow body molding device of FIG. 1.

Next, as shown in FIG. 2, in the die assembled state of the hollow body molding device 11, a molten resin is injected through the injection gate 4 and filled in the main cavity 1. In FIG. 2, the molten resin is filled in the main cavity 1 and the floating core storage portion 6. If the molten resin is filled in at least the main cavity 1, short shot with a small resin amount may be used; however, when the appearance of a molded product is emphasized, full shot is preferably used.

Although the resin used in the present invention includes any thermoplastic resin and thermosetting resin that enable injection-molding of a hollow molded body, the thermoplastic resin is preferably used in terms of hollow moldability in the injection-molding. The thermoplastic resin includes various resins, for example, polystyrene, a polystyrene-based resin such as AS and ABS, a polyolefin-based resin such as polypropylene and polyethylene, a polyamide-based resin such as nylon 66 or nylon 6, a polyester-based resin such as PET and PBT, POM, polycarbonate, PPS, modified PPE, a PMMA resin, and a polyvinyl chloride resin. Further, there may be used those thermoplastic resins containing a reinforcing material, such as glass fiber, talc, calcium carbonate, or kaolin, or an inorganic filler. If the thermosetting resin is an injection moldable resin that is known as BMC such as unsaturated polyester resin and phenol resin, it can be used in the present invention.

Figure 3:
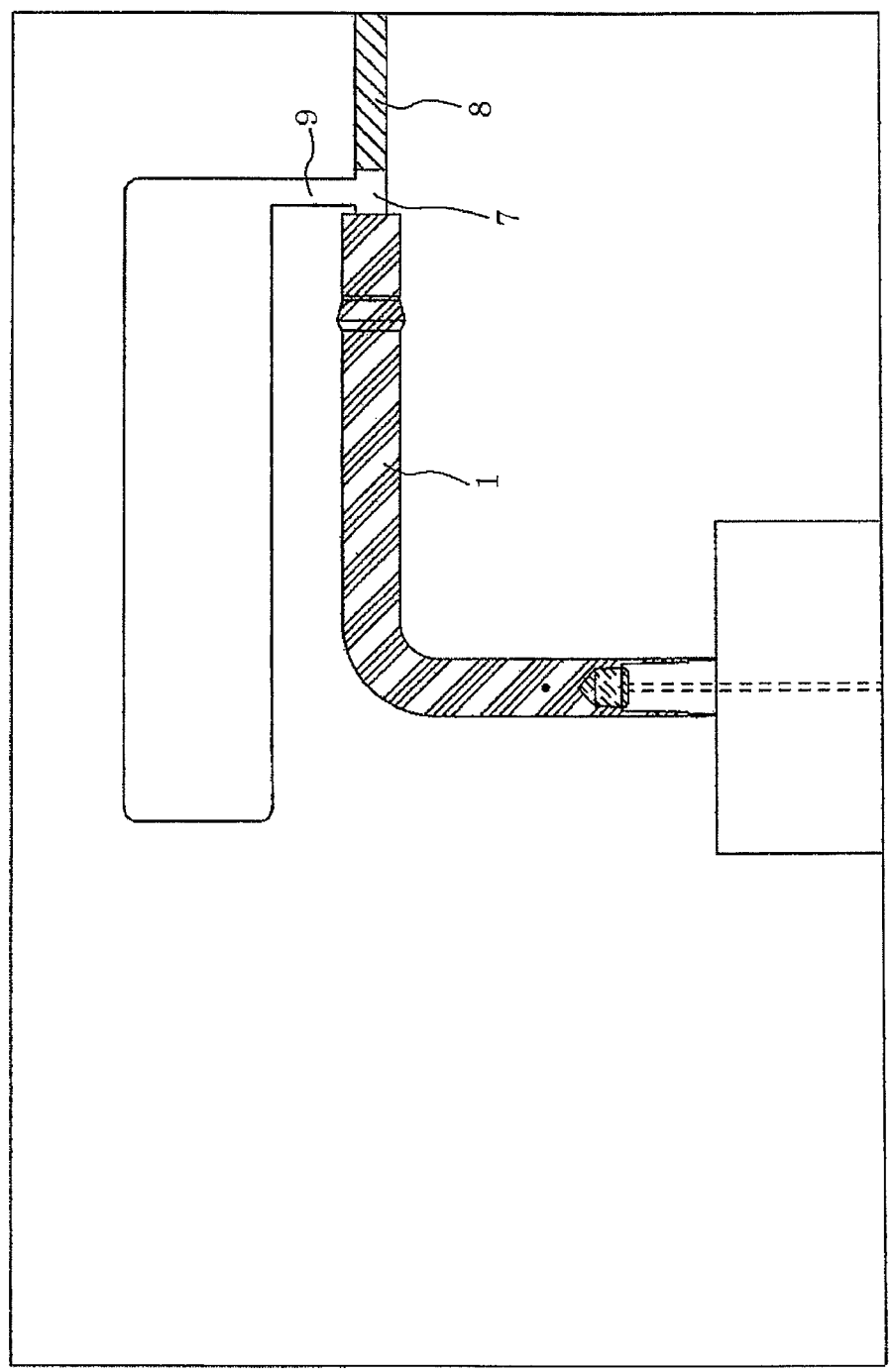
FIG. 3 is a schematic view showing a state in which a communication passage is open before formation of a hollow in the hollow body molding device of FIG. 1.

Next, as shown in FIG. 3, the opening and closing means (shutoff pin) 8 is slided back, so that the communication passage is in an open state. More specifically, the shutoff pin is slided back using a suitable drive source (not shown) such as a hydraulic cylinder to open the inlet of the runner 9. In this case, the shutoff pin is slided back in an arbitrary timing and may be slided back during the injection filling shown in FIG. 2, for example; however, it is preferable that the shutoff pin is slided back in such a state that while the molten resin of a molded body surface in the main cavity 1 is solidified, the inside of the main cavity 1 is not solidified, and namely, it is preferable that the shutoff pin is slided back with a certain time lag after the completion of the injection filling.

Figure 4:
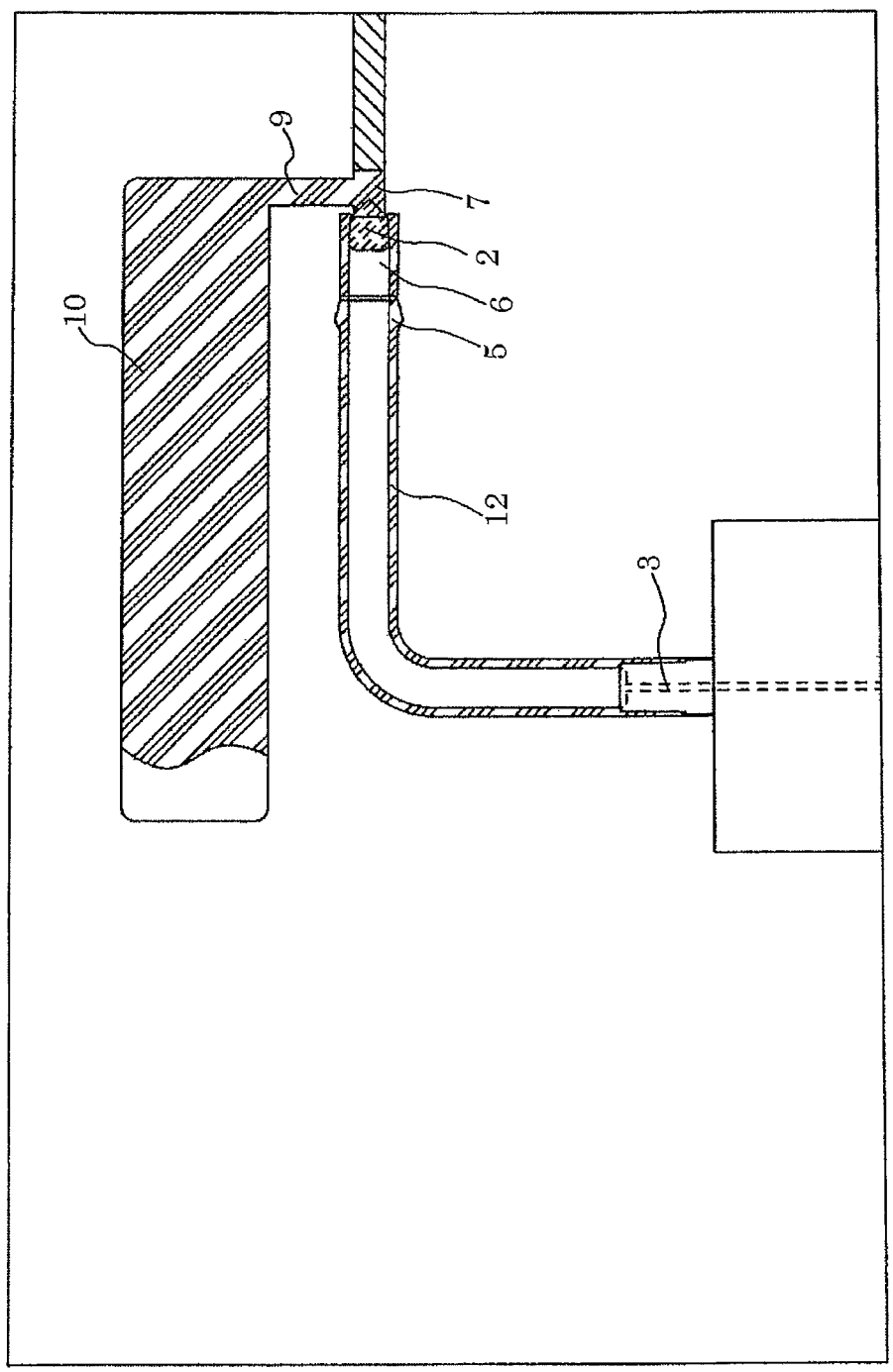
FIG. 4 is a schematic view showing a state of the hollow body molding device of FIG. 1 in which a floating core is moved by pressure-injection of a pressurized fluid to form the hollow, and, at the same time, discharge an excess resin into an auxiliary cavity.

Next, as shown in FIG. 4, a pressurized fluid is pressure-injected from a pressurized fluid source (not shown) through the pressure port 3, and the floating core 2 is moved from the base end of the main cavity 1 toward the molded body end 5. At this time, the floating core 2 passes through the molded body end 5 to form the hollow molded body 12 while forming a hollow having a uniform inner diameter and a smooth inner surface in the molten resin and enters inside the floating core storage portion 6. The floating core 2 entering inside the floating core storage portion 6 is stopped and stored in such a state that the pointed front end slightly protrudes from the floating core storage portion 6 toward the discharge passage 7. Thus, the inner pressure of the hollow molded body 12 is maintained. The molten resin extruded by the floating core 2 is discharged inside the auxiliary cavity 10 through the discharge passage 7 and the runner 9 sequentially.

As the pressurized fluid, there is used a gas or liquid that does not react with or is not compatible with the resin to be used under injection-molding temperature and pressure conditions. Specifically, nitrogen gas, carbon dioxide gas, air, water, glycerin, liquid paraffin, and the like can be used; however, an inert gas containing nitrogen gas is preferably used. In the pressure-injection of the pressurized fluid, for example when a gas such as nitrogen gas is used as the pressurized fluid, a pressurized gas as the pressurized fluid, whose pressure is raised by a compressor, is previously stored in an accumulator (not shown), and the pressurized gas is introduced into the pressure port 6 through a pipe, whereby the pressurized gas can be pressure-injected. Alternatively, the pressurized gas whose pressure is raised by a compressor is directly supplied to the pressure port 16, whereby the pressurized gas can be pressure-injected. Although the pressure of the pressurized gas supplied to the pressure port 3 is different depending on the kind of a resin to be used and the size of the floating core 2, it is usually approximately 4.90 to 29.42 MPaG (50 to 300 kg/cm$^2$G).

After the formation of the hollow, the molten resin is cooled until the molten resin is solidified. Then, the movable die is moved to open the mold, and, thus, to remove a molded body in which the hollow molded body 12, the floating core storage portion 6, the discharge passage 7, and a molded portion formed in the runner 9 and the auxiliary cavity 10 are continued.

Figure 6:
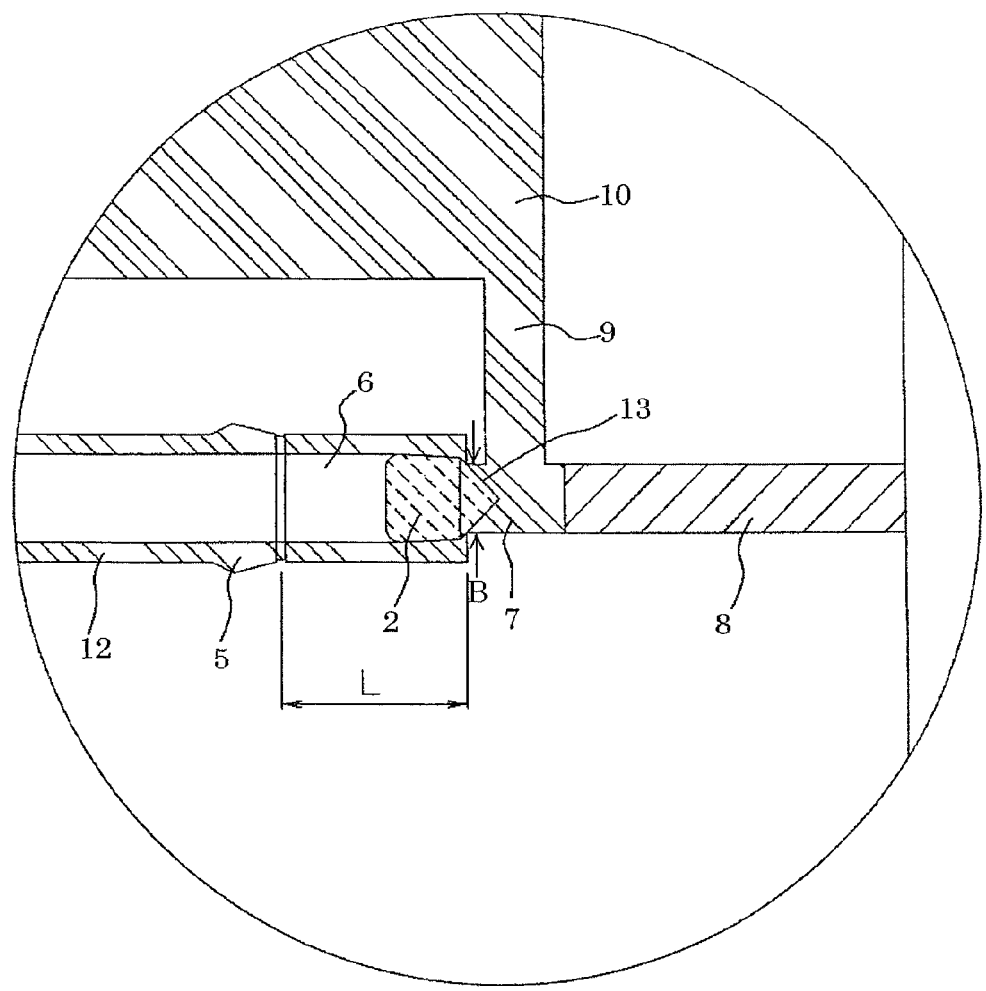
FIG. 6 is an enlarged view showing the vicinity of a floating core storage portion of FIG. 4.

As shown in FIG. 6, the molded portion formed in the floating core storage portion 6 and the molded portion formed in the discharge passage 7 are integrated to such an extent that they are slightly welded to each other in the front end portion of the floating core 2. Since the floating core 2 protrudes to some extent in the form of a wedge, an interface 13 between the front end portion of the floating core 2 and the molded portion formed in the discharge passage 7 has a cut-out shape. Accordingly, the strength of the interface 13 is small, and when a worker bends the vicinity of the interface 13, the molded portion downstream from the floating core storage portion 6 can be easily cut and separated.

Figure 7:
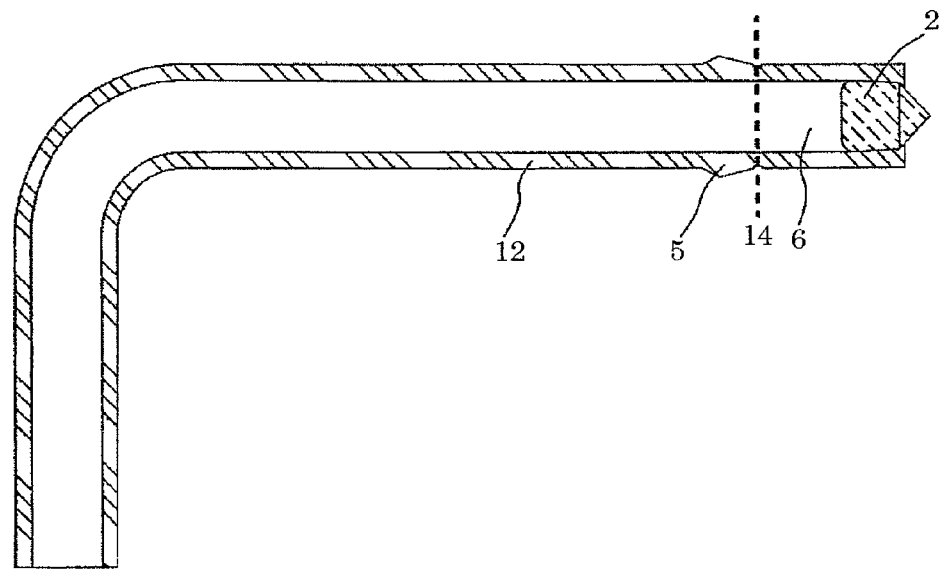
FIG. 7 is a schematic view showing a state of the first embodiment in which a hollow molded body is removed, and a boundary portion between the floating core storage portion and a discharge passage is cut and removed.

FIG. 7 shows a cross section of a molded product cut and separated as described above. As shown in FIG. 7, the front end of the floating core 2 protrudes from the molded portion formed in the floating core storage portion 6. The protruding of the front end of the floating core 2 means that the floating core 2 passes through the main cavity 1 and a good hollow is formed in the hollow molded body 12, and this can be easily confirmed at the site.

In order to thus easily cut and separate the molded portion downstream from the floating core storage portion 6 and reliably visually confirm the protruding of the floating core at the cut and separated portion, the inlet cross-sectional area of the communication passage (inlet cross-sectional area of the discharge passage 7 in this embodiment) B (see, FIG. 6) is preferably $B > \pi A^2/80$, and more preferably $B > \pi A^2/25$. A is the maximum diameter of the floating core 2 (see, FIG. 5). When the inlet cross-sectional area B of the communication passage is not more than $\pi A^2/80$, it may become difficult to cut and separate the molded portion downstream from the floating core storage portion 6, and it may become difficult to visually confirm the protruding of the floating core at the cut and separated portion. Moreover, there may occur such a failure that solidification of the molten resin in the discharge passage 7 is accelerated to result in difficulty in discharging the resin.

Figure 8:
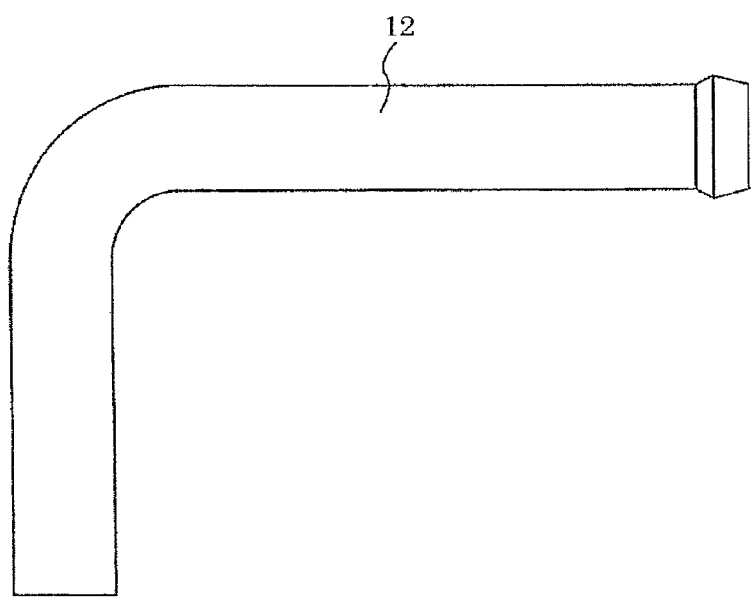
FIG. 8 is a schematic view showing an appearance of the hollow molded body as a finished product.

Next, as shown in FIG. 7, a boundary portion 14 on the floating core storage portion 6 side of the molded body end 5 is cut by cutting means such as a saw, and a hollow molded body (pipe molded product) 12 is finished as a final product shown in FIG. 8. At this time, if a concavo-convex portion or a mark is provided at the molded body end 5 as in this embodiment, the cut portion can be easily determined.

As described above, according to this embodiment, there can be obtained the hollow molded body 12 which has an excellent appearance and an excellent dimensional stability and, at the same time, has a uniform inner diameter and a smooth inner surface. It is possible to easily confirm that the floating core 2 has passed through the main cavity 1, and the quality control at the site is easy.

The floating core 2 of this embodiment has a bullet shape having a pointed front end; therefore, in comparison with a case in which the floating core has a spherical shape, the molded portion downstream from the floating core storage portion 6 is easily cut and separated, and the protruding of the floating core can be easily visually confirmed at the cut and separated portion.

Second Embodiment

Figure 9:
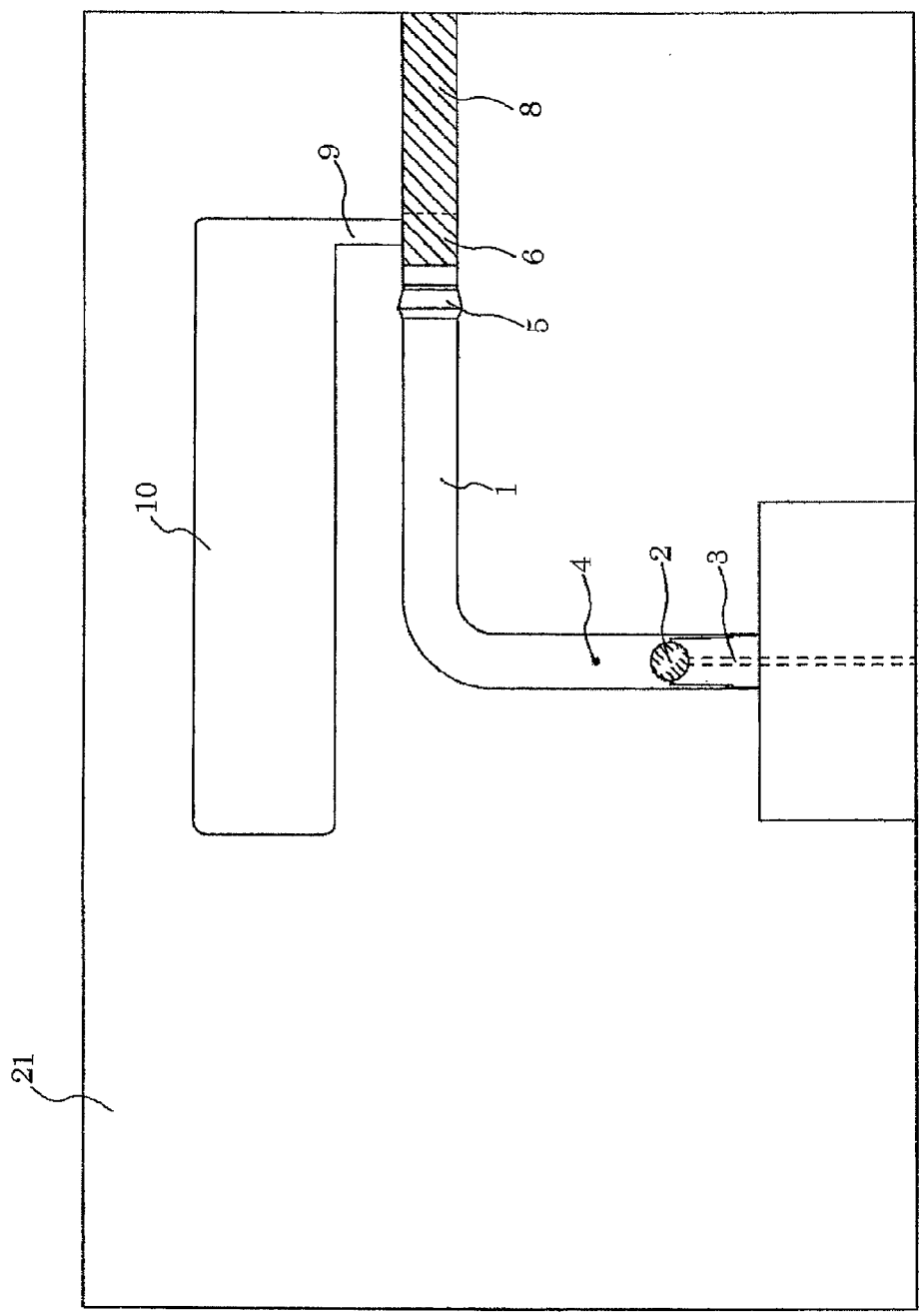
FIG. 9 is a schematic view showing a hollow body molding device of a second embodiment.

Next, a hollow body molding device of this embodiment will be described with reference to FIG. 9. FIG. 9 is a schematic view of a hollow body molding device of this embodiment and shows a state in which a floating core is fitted in a pressure port. In FIG. 9, for convenience of description, an inside of a device 11 is seen even when a stationary die and a movable die are assembled together. In the following description, components having functions the same as those of the components of the first embodiment are assigned the same reference numerals.

The hollow body molding device 21 of this embodiment is an injection molding die as in the first embodiment and is constituted of the stationary die having an injection gate 4 for a molten resin and the movable die moving when being opened and assembled. As shown in FIG. 9, the molding device 21 of this embodiment is constituted of a main cavity 1 for molding a hollow molded body such as a pipe, the injection gate 4 through which a resin is injected into the main cavity 1, a floating core 2, a pressure port 3, a molded body end 5, a floating core storage portion 6, opening and closing means 8 opening and closing a discharge passage 7 by sliding movement, an auxiliary cavity 10 as a waste cavity storing a discharged molten resin, and a runner 9 communicating the auxiliary cavity 10 and the floating core storage portion 6.

Namely, the hollow body molding device 21 of this embodiment is different from the first embodiment in that the runner 9 which is a communication passage to the auxiliary cavity 10 is connected to the floating core storage portion 6 while being branched from the floating core storage portion 6, and the runner 9 is a communication passage communicating the floating core storage portion 6 and the auxiliary cavity 10 with each other.

Further, this embodiment is different from the first embodiment in that opening and closing means 8 slides in the floating core storage portion 6 and thereby opens and closes the communication passage (the runner 9 in this embodiment). The opening and closing means 8 is operated to slide in the floating core storage portion 6 to close the inlet of the runner 9 when a molten resin is filled in the main cavity 1 and slide in the floating core storage portion 6 to open the inlet of the runner 9 when an excess resin discharged by the floating core 2 is stored in the auxiliary cavity 10.

In this embodiment, the inlet cross-sectional area of the communication passage (the inlet cross-sectional area of the runner 9) B (see, FIG. 14) is $B < \pi A^2/4$, for the reason described in the first embodiment. A is the maximum diameter of the floating core 2 (see, FIG. 13).

The length L of the floating core storage portion 6 (see, FIG. 14) is preferably $1.1 K < L < 20 K$, for the reason described in the first embodiment. A is the maximum diameter of the floating core 2 (see, FIG. 13).

Next, a molding method using the hollow body molding device 21 of this embodiment will be described with reference to FIGS. 9 to 15. In FIGS. 9 to 12 and 14, for convenience of description, the inside of the device 21 is seen even when the stationary die and the movable die are assembled together.

As shown in FIG. 9, the floating core 2 is fitted in the pressure port 3 on the base end side of the main cavity 1, and the movable die is moved to place the hollow body molding device 21 in a die assembling state. The opening and closing means 8 is in a state of closing the communication passage. Although the size and material of the floating core 2 are as described in the first embodiment, a spherical floating core is used in this embodiment.

Figure 10:
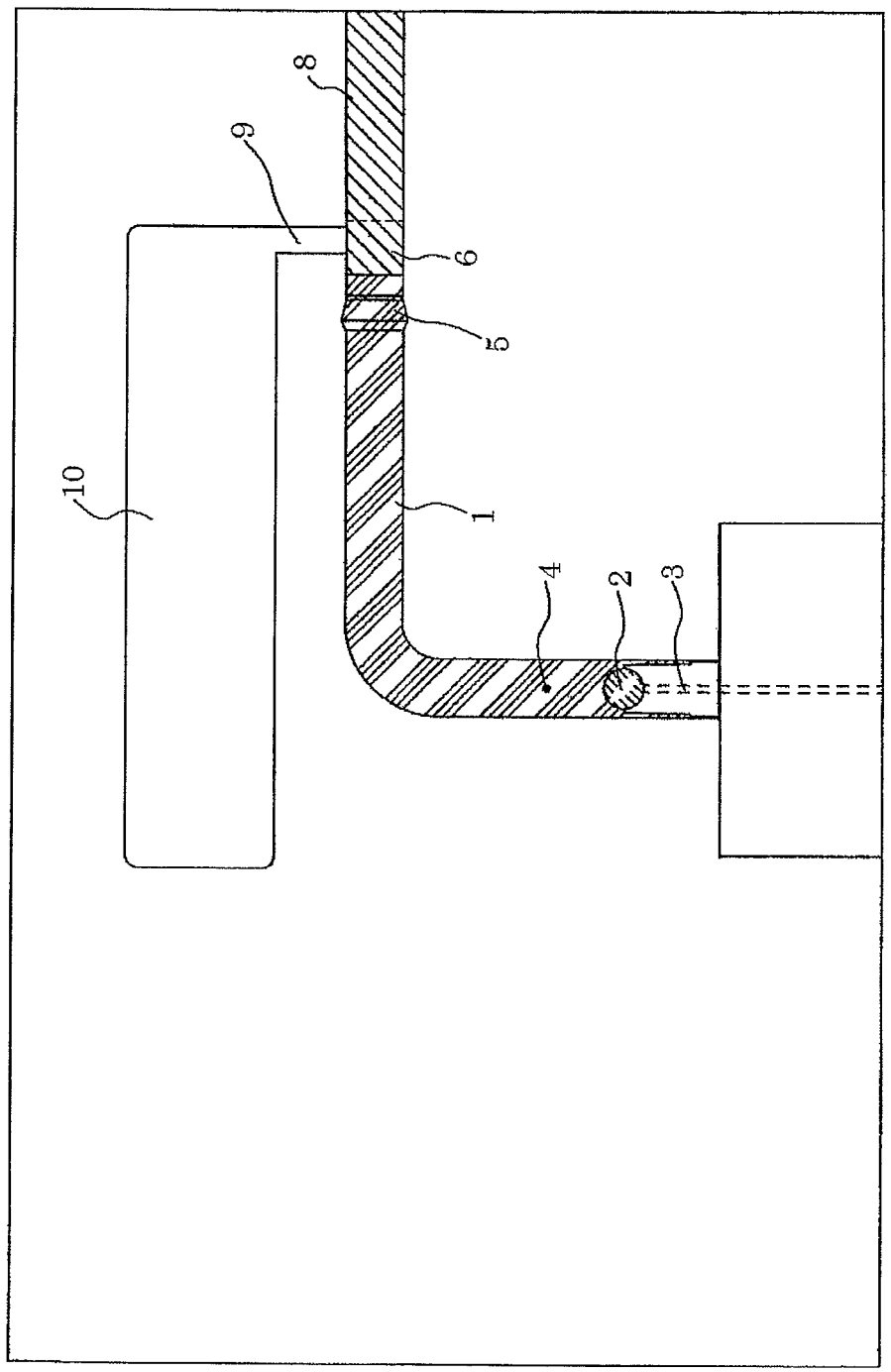
FIG. 10 is a schematic view showing a state in which a molten resin is filled in a main cavity and a floating core storage portion in the hollow body molding device of FIG. 9.

Next, as shown in FIG. 10, in the die assembled state of the hollow body molding device 21, a molten resin is injected through the injection gate 4 and filled in the main cavity 1 and the floating core storage portion 6. In this embodiment, when the appearance of a molded product is emphasized, full shot is preferably used. As a resin to be filled, resins similar to the resins exemplified in the first embodiment can be used.

Figure 11:
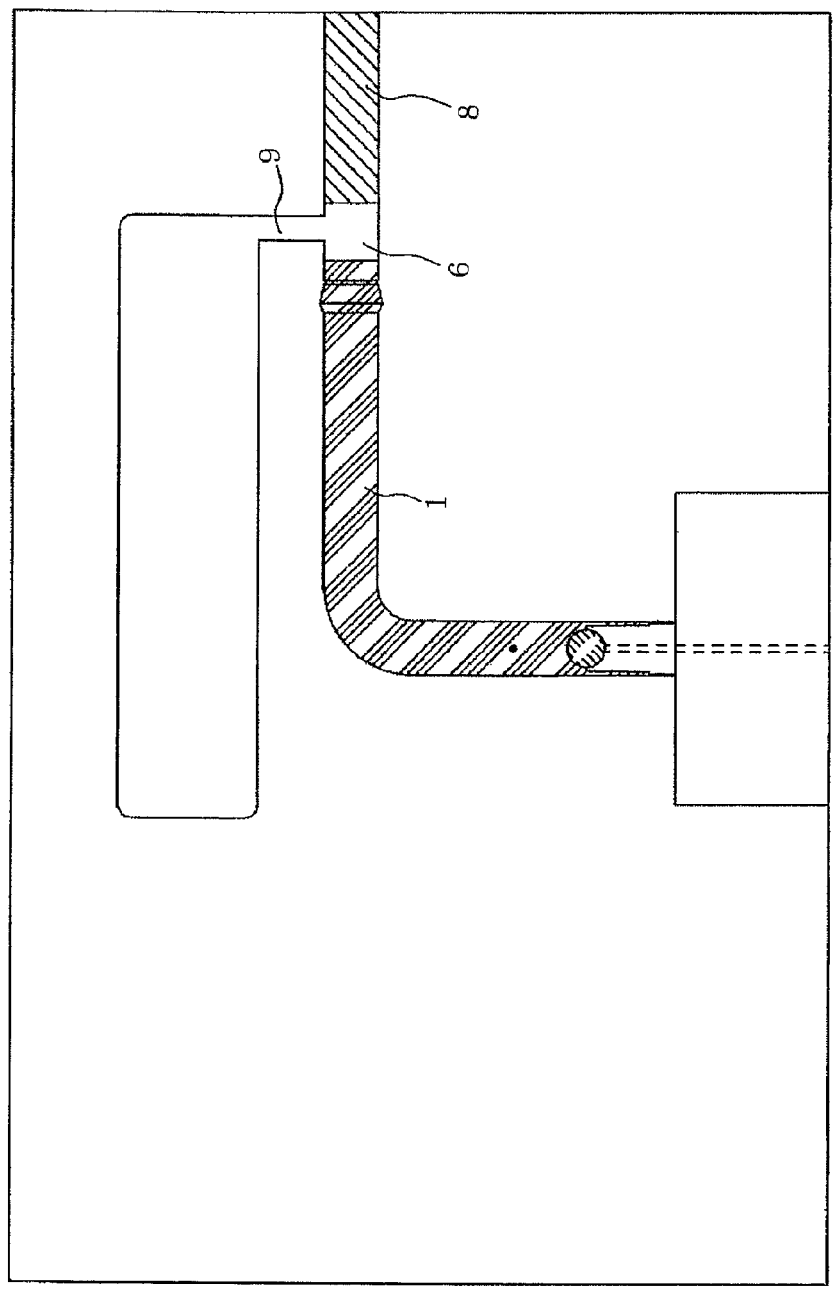
FIG. 11 is a schematic view showing a state in which a communication passage is open before formation of a hollow in the hollow body molding device of FIG. 9.

Next, as shown in FIG. 11, the opening and closing means (shutoff pin) 8 is slided back, so that the communication passage is in an open state. More specifically, the shutoff pin is slided back using a suitable drive source (not shown) such as a hydraulic cylinder to open the inlet of the runner 9. The shutoff pin is slided back in a timing similar to that in the first embodiment.

Figure 12:
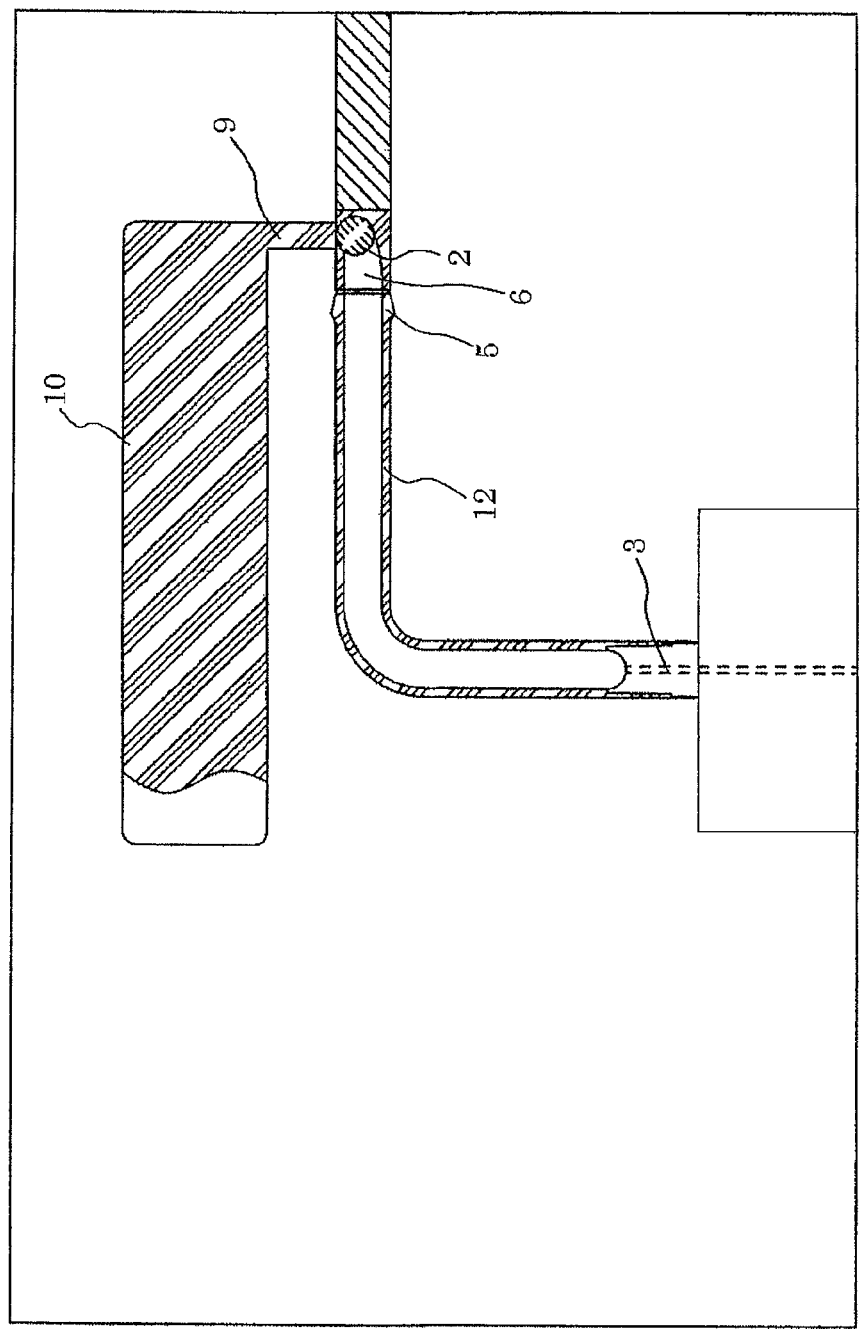
FIG. 12 is a schematic view showing a state of the hollow body molding device of FIG. 9 in which a floating core is moved by pressure-injection of a pressurized fluid to form the hollow, and, at the same time, discharge an excess resin into an auxiliary cavity.

Next, as shown in FIG. 12, a pressurized fluid is pressure-injected from a pressurized fluid source (not shown) through the pressure port 3, and the floating core 2 is moved from the base end of the main cavity 1 toward the molded body end 5. At this time, the floating core 2 passes through the molded body end 5 while forming a hollow in the molten resin to form the hollow molded body 12, and, thus, to enter inside the floating core storage portion 6. The floating core 2 entering inside the floating core storage portion 6 advances toward the inlet of the runner 9 following the flow of the molten resin, forms a curved hollow, and meanwhile is finally stopped and stored in such a state that the spherical surface of the floating core 2 protrudes from the floating core storage portion 6 toward the runner 9. Namely, the floating core 2 closes the inlet of the runner 9, and the inner pressure of the hollow molded body 12 is maintained. The molten resin extruded by the floating core 2 is discharged inside the auxiliary cavity 10 through the runner 9.

After the formation of the hollow, the molten resin is cooled until the molten resin is solidified. Then, the movable die is moved to open the mold, and, thus, to remove a molded body in which the hollow molded body 12, the floating core storage portion 6, and a molded portion formed in the runner 9 and the auxiliary cavity 10 are continued.

Figure 14:
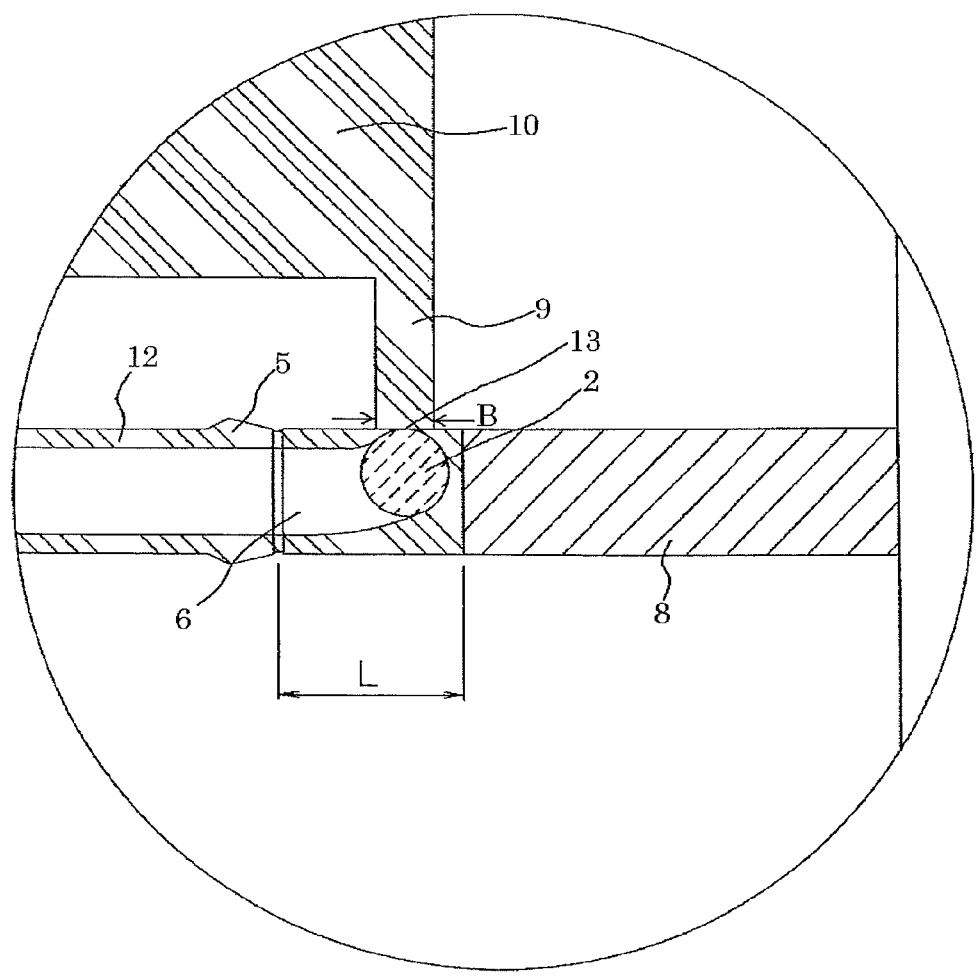
FIG. 14 is an enlarged view showing the vicinity of a floating core storage portion of FIG. 12.

As shown in FIG. 14, the molded portion formed in the floating core storage portion 6 and the molded portion formed in the runner 9 are integrated to such an extent that they are slightly welded to each other on the spherical surface of the floating core 2. Since the floating core 2 spherically protrudes to some extent, an interface 13 between the front end portion of the floating core 2 and the molded portion formed in the runner 9 has a cut-out shape. Accordingly, the strength of the interface 13 is small, and when a worker bends the vicinity of the interface 13, the molded portion downstream from the floating core storage portion 6 can be easily cut and separated.

Figure 15:
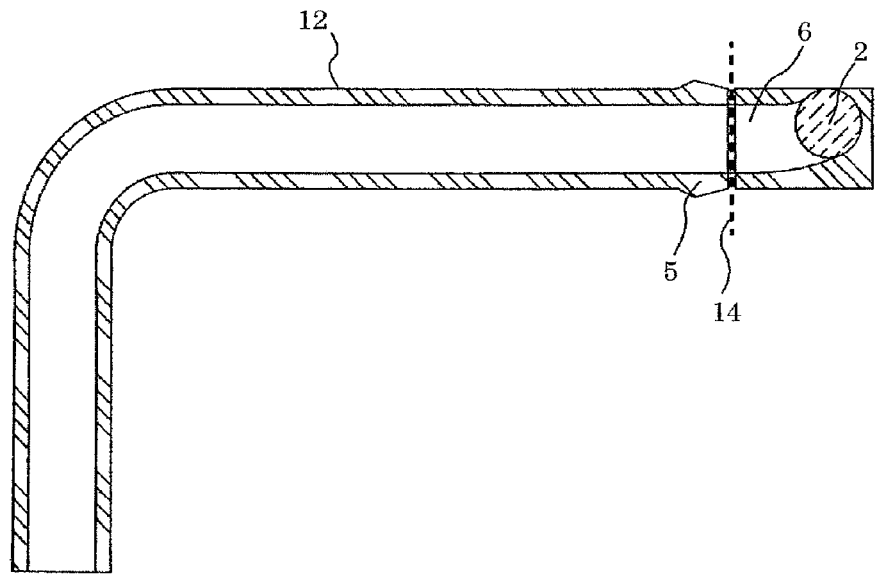
FIG. 15 is a schematic view showing a state in the second embodiment in which a hollow molded body is removed, and a boundary portion between the floating core storage portion and a runner is cut and removed.

FIG. 15 shows a cross section of a molded product cut and separated as described above. As shown in FIG. 15, the spherical surface of the floating core 2 protrudes from a portion corresponding to the inlet of the runner 9 of the molded portion formed in the floating core storage portion 6. The protruding of the spherical surface of the floating core 2 means that the floating core 2 passes through the main cavity 1 and a good hollow is formed in the hollow molded body 12, and this can be easily confirmed at the site.

In order to thus easily cut and separate the molded portion downstream from the floating core storage portion 6 and reliably visually confirm the protruding of the floating core at the cut and separated portion, the inlet cross-sectional area of the communication passage (inlet cross-sectional area of the runner 9 in this embodiment) B (see, FIG. 14) is preferably $B > \pi A^2/80$, and more preferably $B > \pi A^2/25$. A is the maximum diameter of the floating core 2 (see, FIG. 13). When the inlet cross-sectional area B of the communication passage is not more than $\pi A^2/80$, it may become difficult to cut and separate the molded portion downstream from the floating core storage portion 6, and it may become difficult to visually confirm the protruding of the floating core at the cut and separated portion. Moreover, there may occur such a failure that solidification of the molten resin in the runner 9 is accelerated to result in difficulty in discharging the resin in a molten state. In this embodiment, the floating core 2 entering inside the floating core storage portion 6 may advance straight without advancing the inlet of the runner 9.

Subsequently, a boundary portion 14 is cut as in the embodiment 1, and a hollow molded body (pipe molded product) 12 is finished as a final product as in FIG. 8.

As described above, according to this embodiment, advantages basically similar to those of the first embodiment are offered. Particularly, according to this embodiment, there is provided a structure suitable for the use of the spherical floating core 2.

Third Embodiment

Figure 16:
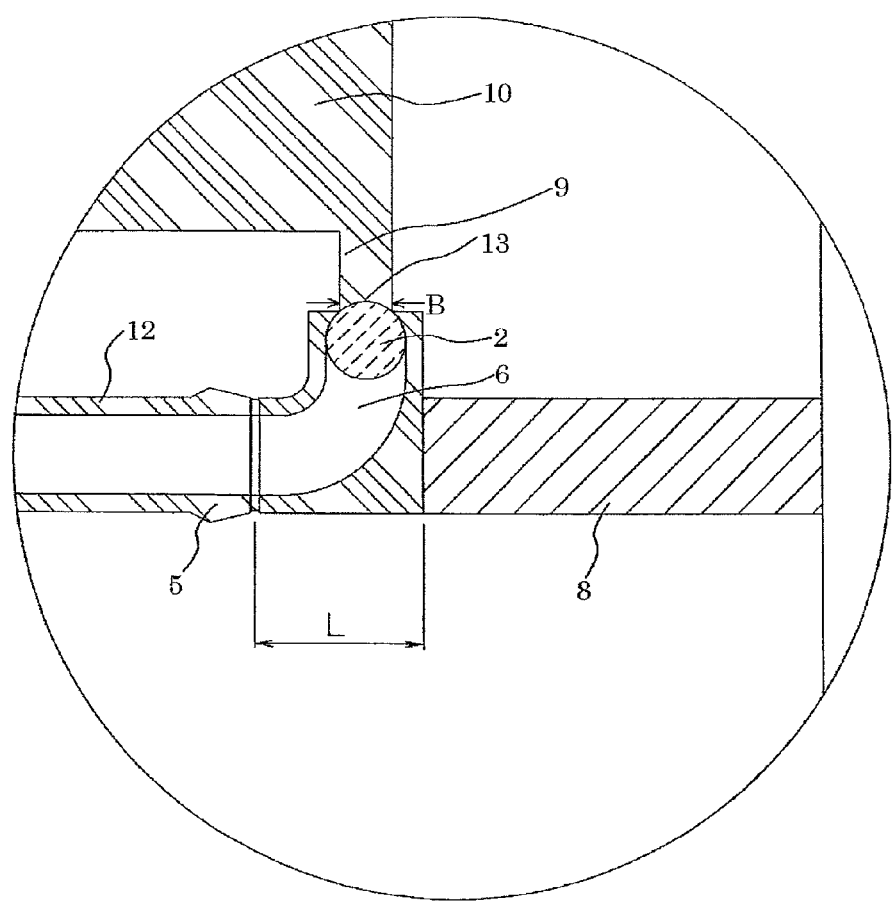
FIG. 16 is an enlarged view showing the vicinity of a floating core storage portion of a third embodiment.
Figure 17:
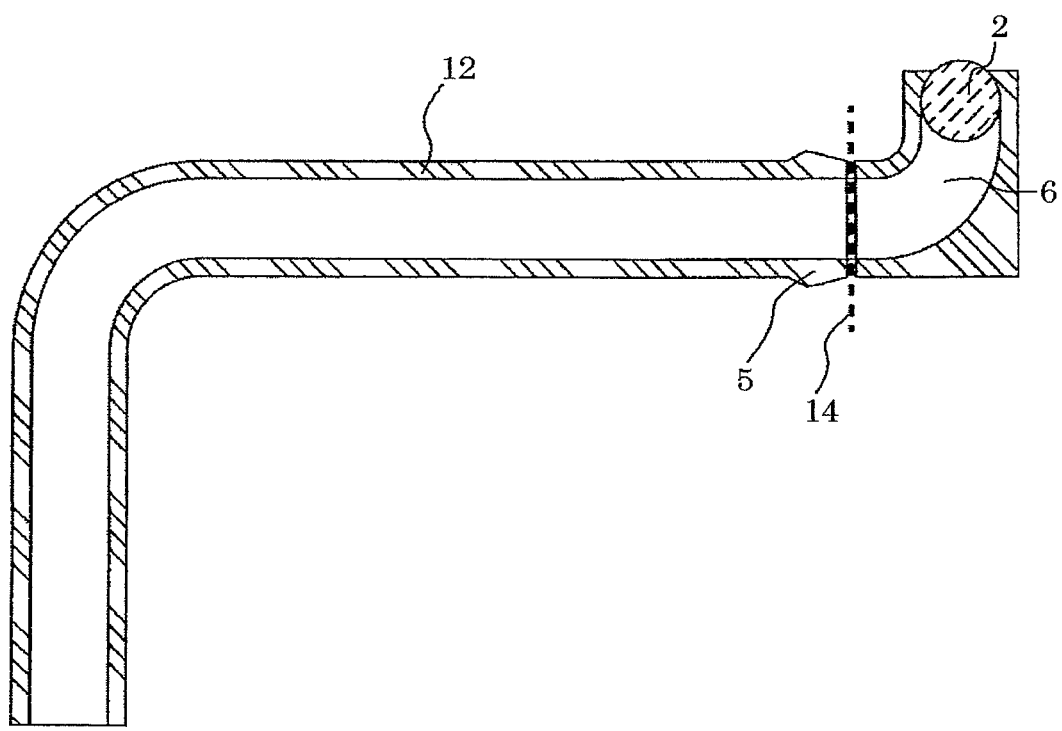
FIG. 17 is a schematic view showing a state in the third embodiment in which a hollow molded body is taken, and a boundary portion between the floating core storage portion and a runner is cut and removed.

As shown in FIGS. 16 and 17, a hollow body molding device of this embodiment is similar to the hollow body molding device of the second embodiment, except that the floating core storage portion 6 is formed into a bent shape. In this case, as shown in FIG. 16, the length L of the floating core storage portion 6 is the length in an extending direction of a straight portion of a main cavity 1 (a sliding direction of an opening and closing means 8).

By virtue of the use of the above structure, a floating core 2 is easily induced to an inlet of a runner 9, and the inlet of the runner 9 can be reliably closed. The structure is suitable for the use of a bullet-shaped floating core as used in the first embodiment. The floating core storage portion 6 having a bent shape can be accommodated in the sliding direction of the opening and closing means 8, the die structure, and the like.

Hereinbefore, although the preferred embodiments of the invention have been described, these embodiments are examples for the purpose of describing the invention, and the invention can be practiced in various aspects different from the above embodiments without departing from the gist of the invention.

EXAMPLES

Example 1

The hollow molded body shown in FIG. 8 (pipe molded product: outer diameter: 26 mm, inner diameter: 18 mm, thickness: 4 mm and length: 300 mm) is molded using the device 11 of FIG. 1.

In the device 11 of FIG. 1, the cross section of the discharge passage 7 has a circular shape, the diameter is 14 mm (the inlet cross-sectional area B is 1.5 cm$^2$), and the length is 20 mm. The length L of the floating core storage portion 6 is 38 mm. The cross section of the opening and closing means (shutoff pin) 8 has a circular shape, the diameter is slightly smaller than the diameter of the discharge passage 7, and the opening and closing means 8 may slide smoothly; however, the opening and closing means 8 has a clearance enough to avoid the passage of a pressurized molten resin.

Figure 5:
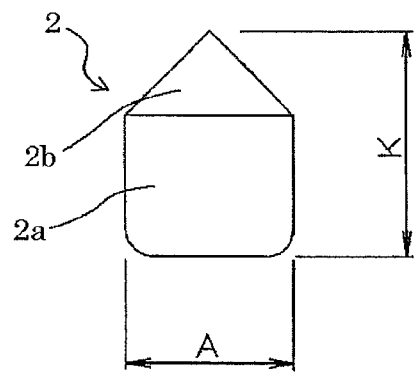
FIG. 5 is a schematic view showing a bullet-shaped floating core in the first embodiment.

The floating core 2 has a bullet shape as shown in FIG. 5, the maximum length K is 22 mm, and the maximum diameter A is 18 mm (the cross-sectional area is 2.5 cm$^2$). Although a cavity for a floating core is not illustrated in FIG. 1, the floating core 2 and the hollow molded body 12 are simultaneously molded by a molding method similar to that disclosed in the Patent Literature 4.

As a molding raw material of the hollow molded body 12, GF reinforced polyamide resin ("Leona 1402G" produced by Asahi Kasei Chemicals Corporation and hereinafter referred to as "GFPA") is used.

First, GFPA is injected through the injection gate 4 at a resin temperature of 280° C. and an injection pressure of 11.8 MPa, using an injection molding machine (TP-180H manufactured by Toyo Machinery & Metal Co., Ltd.), and, as shown in FIG. 2, the main cavity 1 is filled with a molten resin. Then, as shown in FIG. 3, the shutoff pin 8 is slided back by a hydraulic cylinder (not shown) after a lapse of 1 second from the completion of filling of the resin, and the discharge passage 7 is opened.

Subsequently, nitrogen gas having a pressure of 22.6 MPa is pressure-injected through the pressure port 3 connected to a gas generator for gas hollow molding ("air mold" manufactured by Asahi Engineering Co., Ltd.). Then, as shown in FIG. 4, the floating core 2 is moved toward the molded body end 5 to reach the end of the floating core storage portion 6. At this time, molten GFPA discharged by the floating core 2 is flowed into the auxiliary cavity 10 sequentially through the discharge passage 7 and the runner 9.

The GFPA is cooled until the GFPA in the main cavity 1, the floating core storage portion 6, the discharge passage 7, the runner 9, and the auxiliary cavity 10 is solidified. After that, the mold is opened, and the hollow molded body 12 and a molded portion formed in the floating core storage portion 6, the discharge passage 7, the runner 9, and the auxiliary cavity 10 are removed as an integrated molded body.

After that, when a worker bends the vicinity of the interface 13 (see, FIG. 6), the molded portion downstream from the floating core storage portion 6 can be easily cut and separated, and a molded body shown in FIG. 7 in which the hollow molded body 12 and the molded portion formed in the floating core storage portion 6 are integrated is obtained. The pointed front end of the floating core 2 protrudes from a tail end of the molded portion formed in the floating core storage portion 6, so that the formation of a good hollow can be confirmed at the site. The molded body is cut at the boundary portion 14, and the hollow molded body (pipe molded product) 12 is obtained as a final product shown in FIG. 8.

Example 2

The hollow molded body shown in FIG. 8 is molded as in the example 1, except for using the device 21 of FIG. 9.

In the device 21 of FIG. 9, the cross section of the runner 9 has a circular shape, and the diameter is 14 mm (the inlet cross-sectional area B is 1.5 cm$^2$). The length L of the floating core storage portion 6 is 38 mm. The cross section of the opening and closing means (shutoff pin) 8 has a circular shape, the diameter is slightly smaller than the diameter of the floating core storage portion 6, and the opening and closing means 8 may slide smoothly; however, the opening and closing means 8 has a clearance enough to avoid the passage of a pressurized molten resin.

Figure 13:
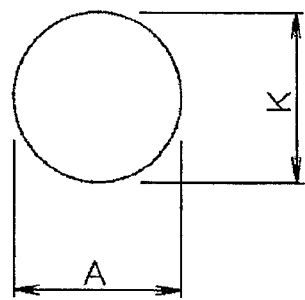
FIG. 13 is a schematic view showing a spherical-shaped floating core in the second embodiment.

The floating core 2 has a spherical shape as shown in FIG. 13, the maximum diameter A (diameter) is 18 mm (the cross-sectional area is 2.5 cm$^2$), and the maximum length K (diameter) is 18 mm. The floating core 2 is molded simultaneously the molding of the hollow molded body 12 as in the example 1.

After the termination of the molding, the pipe molded product 12 and a molded portion formed in the floating core storage portion 6, the runner 9, and the auxiliary cavity 10 are removed as an integrated molded body. After that, when a worker manually bends the vicinity of the interface 13 (see, FIG. 14), the molded portion downstream from the floating core storage portion 6 can be easily cut and separated, and a molded body shown in FIG. 15 in which the hollow molded body 12 and the molded portion formed in the floating core storage portion 6 are integrated is obtained. The spherical surface of the floating core 2 protrudes from a portion corresponding to the inlet of the runner 9 of the molded portion formed in the floating core storage portion 6, so that the formation of a good hollow can be confirmed at the site. The molded body is cut at the boundary portion 14, and the hollow molded body (pipe molded product) 12 is obtained as a final product shown in FIG. 8.

INDUSTRIAL APPLICABILITY

A hollow body molding device according to the present invention is applicable to manufacturing of a hollow molded body (pipe molded product) having a bent portion, such as cooling system pipes of an automobile and pipes for various heat exchangers.

DESCRIPTION OF THE REFERENCE NUMERALS

1 Main cavity
2 Floating core
3 Pressure port
4 Injection gate
5 Molded body end
6 Floating core storage portion
7 Discharge passage
8 Opening and closing means
9 Runner
10 Auxiliary cavity
11, 21 Hollow body molding device
12 Hollow molded body (pipe molded product)
13 Interface
14 Boundary portion

The invention claimed is:

1. A hollow body molding device in which a molten resin is injected into a main cavity having on its one end a pressure port including a floating core and on its other end an outlet, a pressurized fluid is pressure-injected through the pressure port after the injection of the molten resin, the floating core is moved to the outlet side, the molten resin is extruded from the outlet simultaneously with the movement of the floating core, and the hollow molded body is molded,
comprising:
a floating core storage portion which is connected to the main cavity and stores the floating core moved by the pressurized fluid;
an auxiliary cavity which stores a molten resin discharged from the main cavity and the floating core storage portion;
a communication passage which communicates the floating core storage portion and the auxiliary cavity with each other; and
an opening and closing means that opens and closes the communication passage by sliding movement,
wherein the communication passage includes a discharge passage connecting the floating core storage portion and a runner communicating the discharge passage and the auxiliary cavity with each other,
the opening and closing means slides in the discharge passage, and
an inlet cross-sectional area B of the communication passage is B<$\pi$A$^2$/4 (A is the maximum diameter of the floating core).

2. The hollow body molding device according to claim 1, wherein the floating core has a bullet shape.

3. A hollow body molding device, in which a molten resin is injected into a main cavity having on its one end a pressure port including a floating core and on its other end an outlet, a pressurized fluid is pressure-injected through the pressure port after the injection of the molten resin, the floating core is moved to the outlet side, the molten resin is extruded from the outlet simultaneously with the movement of the floating core, and the hollow molded body is molded,
comprising:
a floating core storage portion which is connected to the main cavity and stores the floating core moved by the pressurized fluid;
an auxiliary cavity which stores a molten resin discharged from the main cavity and the floating core storage portion;
a communication passage which communicates the floating core storage portion and the auxiliary cavity with each other; and an opening and closing means that opens and closes the communication passage by sliding movement, wherein the communication passage includes a runner communicating the floating core storage portion and the auxiliary cavity with each other, the opening and closing means slides in the floating core storage portion, and an inlet cross-sectional area B of the communication passage is $B<\pi A^2/4$ (A is the maximum diameter of the floating core).

4. The hollow body molding device according to any one of claims 1 to 3, wherein the inlet cross-sectional area B of the communication passage is $B>\pi A^2/80$ (A is the maximum diameter of the floating core).

5. The hollow body molding device according to any one of claims 1 to 3, wherein the length L of the floating core storage portion is $L>1.1\,K$ (K is the maximum length of the floating core).

\* \* \* \* \*